United States Patent [19]

Yamada

[11] Patent Number: 5,680,259
[45] Date of Patent: Oct. 21, 1997

[54] WIDE ANGLE LENS

[75] Inventor: Hiroshi Yamada, Omiya, Japan

[73] Assignee: Fuji Photo Optical Co., Ltd., Omiya, Japan

[21] Appl. No.: 653,691

[22] Filed: May 23, 1996

[30] Foreign Application Priority Data

Jun. 29, 1995 [JP] Japan ................. 7-186309

[51] Int. Cl.$^6$ ............... G02B 13/04; G02B 3/02; G02B 21/02; G02B 9/34
[52] U.S. Cl. ............... 359/753; 359/715; 359/661; 359/781
[58] Field of Search .............. 359/749–753, 359/661, 781, 715

[56] References Cited

U.S. PATENT DOCUMENTS

| | | | |
|---|---|---|---|
| 2,824,495 | 2/1958 | Klemt | 359/752 |
| 3,230,826 | 1/1966 | Bednarz | 359/751 |
| 3,331,652 | 7/1967 | Shelley | 359/751 |
| 3,497,291 | 2/1970 | Woltche | 359/752 |
| 3,512,874 | 5/1970 | Woltche | 359/750 |
| 3,524,697 | 8/1970 | Isshiki et al. | 359/752 |
| 3,549,241 | 12/1970 | Mori | 359/750 |
| 3,567,310 | 3/1971 | Bertele | 359/752 |
| 3,601,473 | 8/1971 | Mandler et al. | 359/752 |
| 3,734,600 | 5/1973 | Shimizu | 359/753 |
| 3,799,655 | 3/1974 | Laikin | 359/753 |
| 3,874,770 | 4/1975 | Shimizu | 359/751 |
| 4,412,726 | 11/1983 | Horimoto | 359/753 |
| 4,487,485 | 12/1984 | Hisada | 359/750 |
| 5,477,389 | 12/1995 | Ito et al. | 359/749 |

*Primary Examiner*—Georgia Y. Epps
*Assistant Examiner*—Evelyn A. Lester
*Attorney, Agent, or Firm*—Ronald R. Snider

[57] ABSTRACT

A wide angle lens is constituted by four sheets of concave, concave, convex, and convex lenses successively arranged from the object side so as to satisfy predetermined conditional expressions concerning focal lengths, whereby various kinds of aberration are favorably corrected and, while the cost required for molding each lens is minimized, a higher brightness can be obtained as compared with the conventional wide angle lens. From the object side, first, second, third, and fourth lenses ($L_1$ to $L_4$) are successively disposed. Each of the first lens ($L_1$) and second lens ($L_2$) is made of a negative meniscus lens whose concave surface with a stronger curvature is directed toward the imaging surface (1), while each of the third lens ($L_3$) and the fourth lens ($L_4$) is made of a biconvex lens whose surface with a stronger curvature is directed toward the imaging surface (1), such that $f_2/f_1$ is 0.888 thereby satisfying a conditional expression of $0.8 < f_2/f_1 < 1.2$ and that $f_4/f_3$ is 1.103 thereby satisfying a conditional expression of $0.8 < f_4/f_3 < 1.2$.

2 Claims, 5 Drawing Sheets

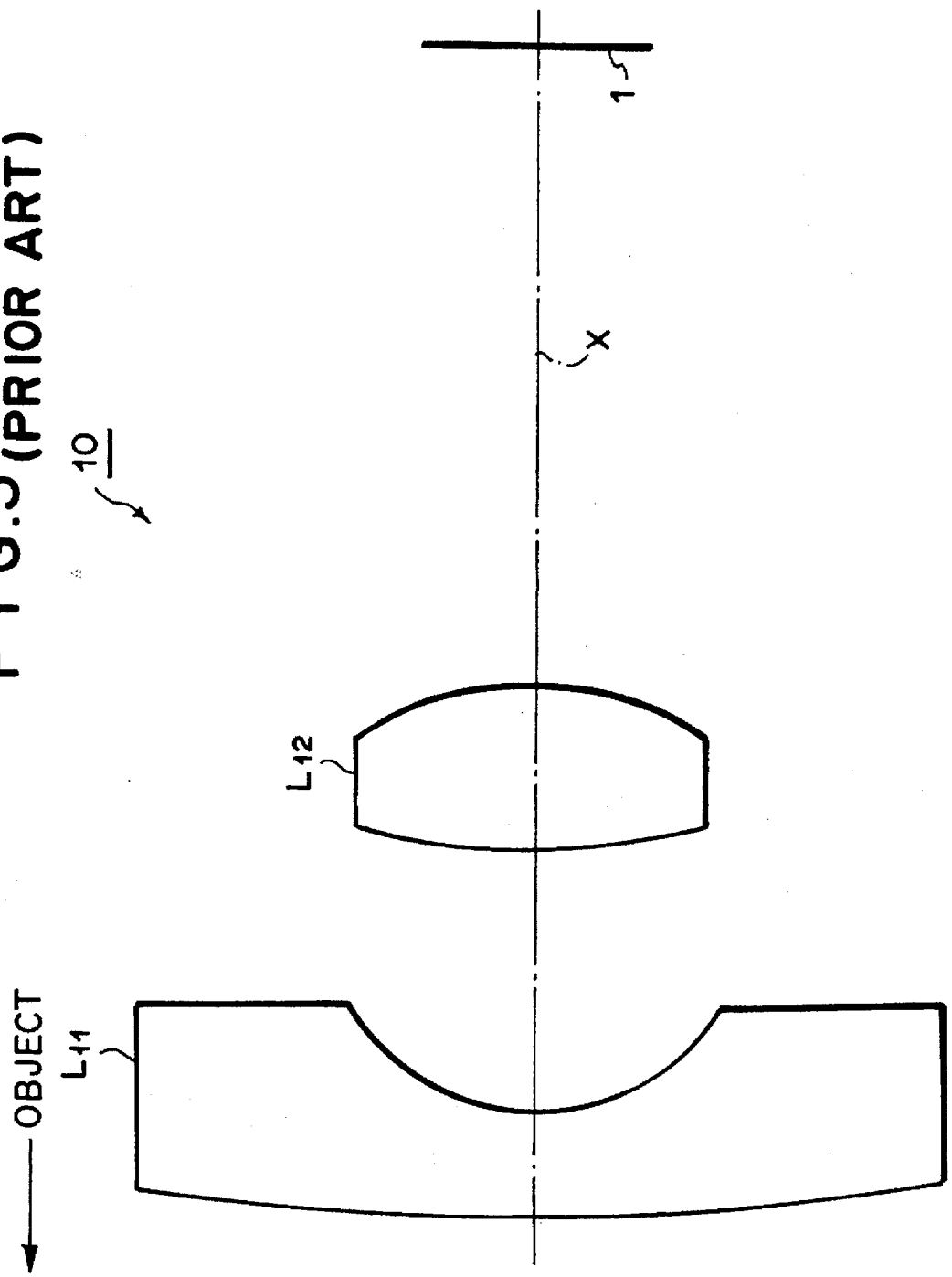

WIDE ANGLE LENS

RELATED APPLICATIONS

This application claims the priority of Japanese Patent Application No. 7-186309 filed on Jun. 29, 1995, which is incorporated herein by reference.

BACKGROUND OF THE INVENTION

1. Field of the Invention

The present invention relates to a wide angle lens and, in paricular, to that suitably used for a camera lens of video camera, still video camera, and the like for television telephone, door phone, monitoring, and the like.

2. Description of the Prior Art

In recent years, solid-state image pickup devices have been disposed on image pickup surfaces in most of various video cameras and still video cameras. As technologies advance, such solid-state image pickup devices have become smaller and less expensive year by year. Accordingly, there has also been a demand for imaging lenses which are inexpensive while being bright and having a wide angle.

FIG. 5 is a cross-sectional view showing a lens system of a conventional wide angle lens. Here, in this drawing, X depicts the optical axis.

A conventional wide angle lens 10 shown in this drawing has a two-sheet lens configuration comprising a first lens $L_{11}$ made of a meniscus lens with a negative refractive power whose convex surface is directed toward the object and a second lens $L_{12}$ having a positive refractive power.

SUMMARY OF THE INVENTION

However, since the above-mentioned wide angle lens 10 may be problematic in terms of its aberration, there has been a demand for improving its various kinds of aberration.

In view of such a circumstance, the first object of the present invention is to provide a wide angle lens with a simple configuration which can greatly improve various kinds of aberration.

On the other hand, since the above-mentioned wide angle lens 10 bas an $F_{NO}$ of about 2.8, it may be problematic in terms of brightness. In this case, an appropriate lens may be provided in addition to the above-mentioned two lenses $L_{11}$ and $L_{12}$ so as to form a lens system with an $F_{NO}$ smaller than 2.8, thereby overcoming the above-mentioned problem of brightness.

However, when the number of lenses is increased in order to obtain a bright lens system, additional cost is necessary for lens molding, thereby increasing the manufacturing cost of the lens system.

Namely, a new lens mold has to be made for the above-mentioned lens added to the lens system.

In order to overcome these problems, the second object of the present invention is to provide a wide angle lens which is brighter than the conventional wide angle lens, while minimizing the cost required for molding each lens.

The wide angle lens of the present invention comprises, successively from the object side, fast, second, third, and fourth lenses. Each of the first and second lenses is made of a concave lens whose concave surface with a stronger curvature is directed toward the imaging surface, whereas each of the third and fourth lenses is made of a convex lens.

The fast and second lenses have at least one aspheric surface each and are configured so as to satisfy a conditional expression:

$$0.8 < f_2/f_1 < 1.2 \quad (1)$$

wherein $f_1$ and $f_2$ are their respective focal lengths.

The third and fourth lenses have at least one aspheric surface each and are configured so as to satisfy a conditional expression:

$$0.8 < f_4/f_3 < 1.2 \quad (2)$$

wherein $f_3$ and $f_4$ are their respective focal lengths.

Preferably, in the wide angle lens of the present invention, the fast and second lenses are configured so as to satisfy a conditional expression:

$$f_2/f_1 = 1 \quad (3)$$

wherein $f_1$ and $f_2$ are their respective focal lengths.

Also, preferably, the third and fourth lenses are configured so as to satisfy a conditional expression:

$$f_4/f_3 = 1 \quad (4)$$

wherein $f_3$ and $f_4$ are their respective focal lengths.

The objects of the present invention are attained by the wide angle lens configured as mentioned above. In the following, the operation of each lens will be explained.

First, since the first and second lenses, which are concave lenses having at least one aspheric surface each and satisfying conditional expression (1), are disposed such that their respective concave surfaces having a stronger curvature are directed toward the imaging surface, the concave refractive power is divided into two so as to favorably correct curvature of field and distortion.

Next, since the third and fourth lenses, which are convex lenses having at least one aspheric surface each and satisfying conditional expression (2), are disposed, spherical aberration and coma are favorably corrected.

Also, when the first and second lenses satisfy the above-mentioned conditional expression (3) so as to have an identical form and the third and fourth lenses satisfy the above-mentioned conditional expression (4) so as to have an identical form, while various kinds of aberration can be favorably corrected as in the case of the above-mentioned wide angle lens, the first and second lenses can be formed by an identical mold and the third and fourth lenses can be formed by an identical mold, whereby increase in the cost for molding each lens can be minimized.

BRIEF DESCRIPTION OF THE DRAWINGS

FIG. 5 is a cross-sectional view showing the lens system of a conventional wide angle lens.

DETAILED DESCRIPTION OF THE PREFERRED EMBODIMENTS

In the following, embodiments of the present invention will be explained in detail with reference to drawings.

Figure 1:
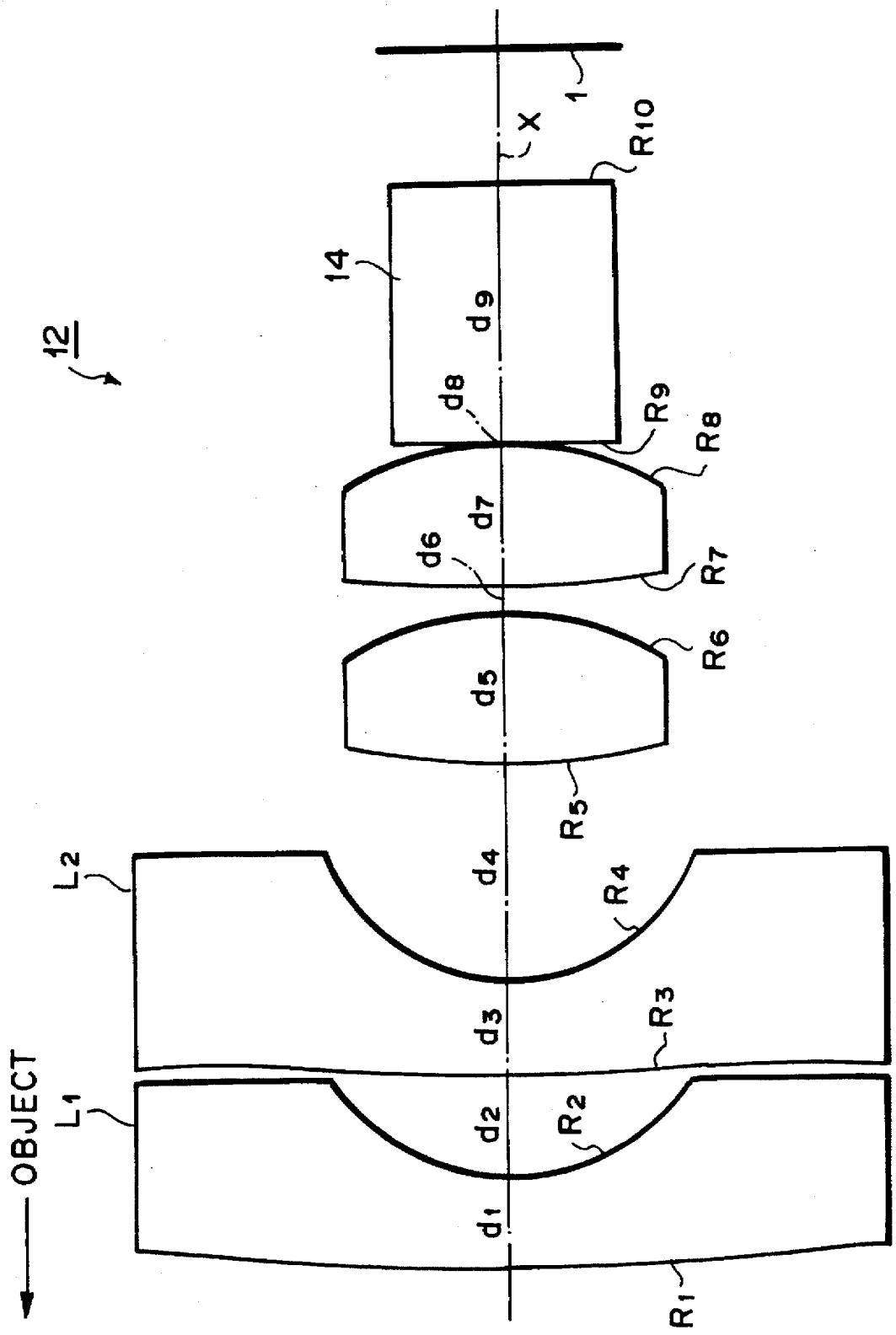
FIG. 1 is a cross-sectional view showing the lens system of a wide angle lens in accordance with the first embodiment of the present invention.

FIG. 1 is a cross-sectional view showing the lens system of a wide angle lens in accordance with the first embodiment of the present invention.

A wide angle lens 12 shown in this drawing comprises, successively from the object side, first, second, third, and fourth lenses $L_1$ to $L_4$ and a plane parallel plate 14 which functions as a low-pass filter, an infrared cutoff filter, and a CCD cover glass. Here, in this drawing, X depicts the optical axis.

Each of the first lens $L_1$ and second lens $L_2$ is made of a negative meniscus lens whose concave surface having a stronger curvature is directed toward an imaging surface 1, while each of the third lens $L_3$ and fourth lens $L_4$ is made of a biconvex lens whose convex surface having a stronger curvature is directed toward the imaging surface 1.

Here, the first lens $L_1$ and the second lens $L_2$ are formed such that the latter is thicker than the former.

Table 1 in the following shows radius of curvature R (mm) of each lens surface near the optical axis X, center thickness of each lens and air gap between neighboring lenses d (mm), refractive index $N_d$ of each lens at d-line, and Abbe number $v_d$ of each lens in the first embodiment.

Here, in this table, the numbers identifying each of the marks R, d, $N_d$, and $v_d$ successively increase from the object side.

In this embodiment, composite focal length f of the whole lens system is 2.24, $F_{NO}$ is 1.44, and field angle 2ω is 121.0°.

Also, the ratio of the focal length of the second lens $L_2$ to that of the first lens $L_1$, namely, $f_2/f_1$ is 0.888, thereby satisfying the conditional expression of:

$$0.8 < f_2/f_1 < 1.2$$

The ratio of the focal length of the fourth lens $L_4$ to that of the third lens $L_3$, namely, $f_4/f_3$ is 1.103, thereby satisfying the conditional expression of:

$$0.8 < f_4/f_3 < 1.2$$

Further, both sides of each of the first lens $L_1$, second lens $L_2$, third lens $L_3$, and fourth lens $L_4$ are aspheric surfaces. Their forms are expressed by the following aspheric surface expression:

$$X = \frac{CY^2}{1 + \sqrt{1 - K^2 C Y^2}} + \sum_{i=1}^{N} a_i Y^{2i} \quad \text{Equation 1}$$

Wherin $$C = \frac{1}{R}$$

when coefficients C, K, $a_1$, $a_2$, $a_3$, $a_4$, and $a_5$ are represented by their values shown in Table 2 (following).

Here, in the above-mentioned aspheric surface expression, X is distance from the lens surface in the direction of the optical axis X, whereas Y is distance from the optical axis X in the direction perpendicular to the optical axis X. Also, C is curvature.

Figure 2:
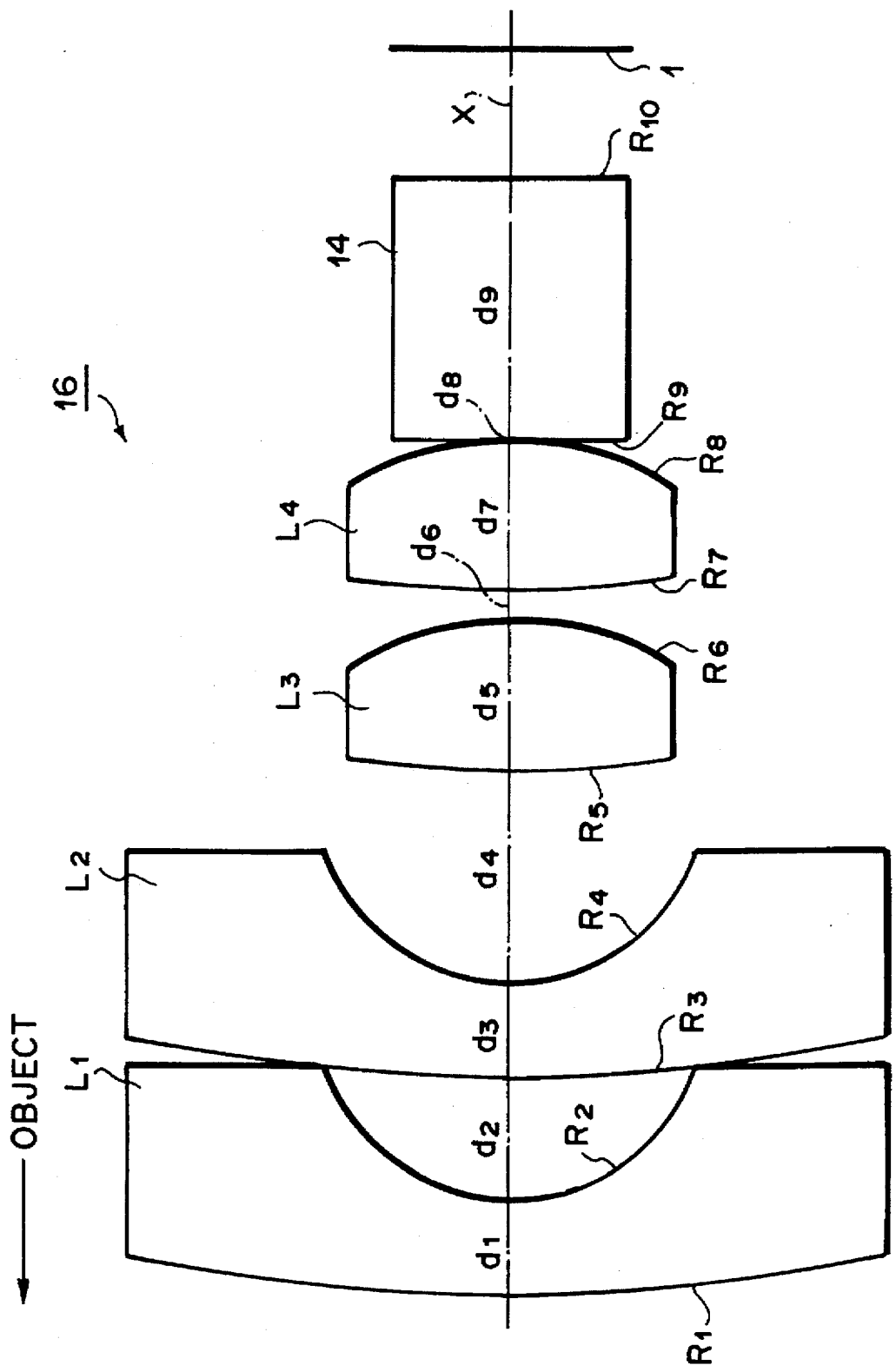
FIG. 2 is a cross-sectional view showing the lens system of a wide angle lens in accordance with the second embodiment of the present invention.

FIG. 2 is a cross-sectional view showing the lens system of a wide angle lens 16 in accordance with the second embodiment of the present invention.

While the respective lenses in the second embodiment have forms nearly identical to those constituting the first embodiment, the second embodiment differs from the first embodiment in that the first lens $L_1$ and the second lens $L_2$ have the same thickness.

Table 3 in the following shows radius of curvature R (mm) of each lens surface near the optical axis X, center thickness of each lens and air gap between neighboring lenses d (mm), refractive index $N_d$ of each lens at d-line, and Abbe number $v_d$ of each lens in the second embodiment.

Here, in this table, the numbers identifying each of the marks R, d, $N_d$, and $v_d$ successively increase from the object side.

In this embodiment, composite focal length f of the whole lens system is 2.23, $F_{NO}$ is 1.44, and field angle 2ω is 118.9°.

Also, the ratio of the focal length of the second lens $L_2$ to that of the first lens $L_1$, namely, $f_2/f_1$ is 1.000, thereby satisfying the conditional expression of:

$$f_2/f_1 = 1$$

The ratio of the focal length of the fourth lens $L_4$ to that of the third lens $L_3$, namely; $f_4/f_3$ is 1.000, thereby satisfying the conditional expression of:

$$f_4/f_3 = 1$$

Further, both sides of each of the first lens $L_1$, second lens $L_2$, third lens $L_3$, and fourth lens $L_4$ are aspheric surfaces. Their forms are expressed by the above-mentioned aspheric surface expression when coefficients C, K, $a_1$, $a_2$, $a_3$, $a_4$, and $a_5$ are represented by their values shown in Table 4 (following).

Figure 3:
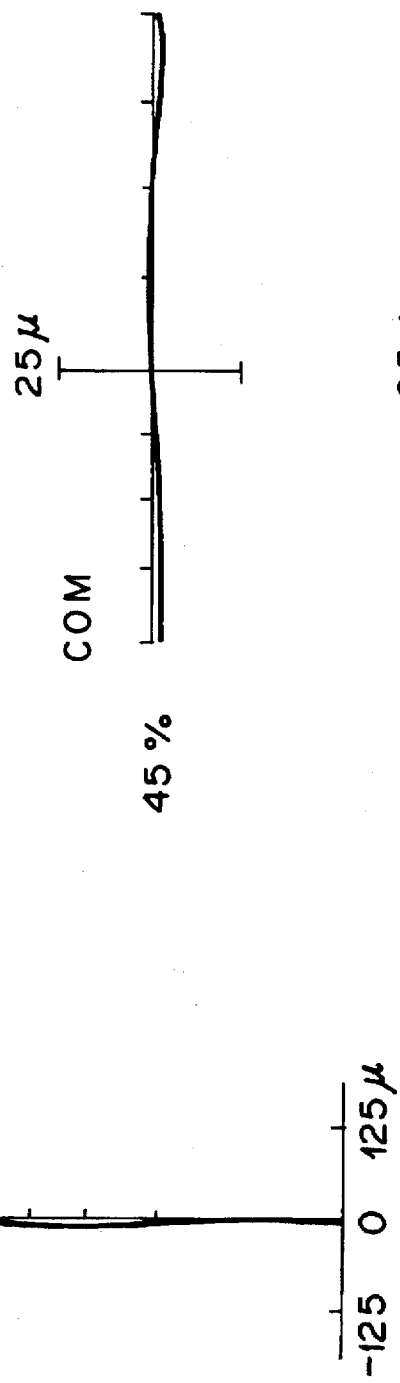
FIG. 3 is an aberration chart of the wide angle lens in accordance with the first embodiment of the present invention.
Figure 3:
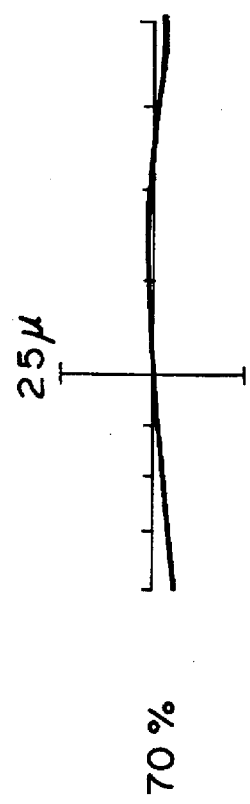
Figure 3:
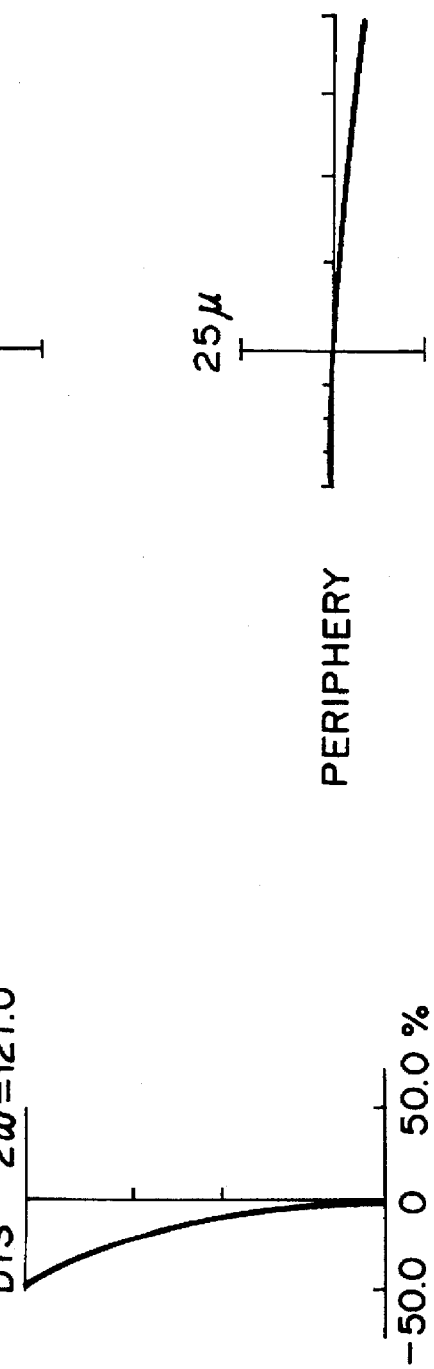
Figure 4:
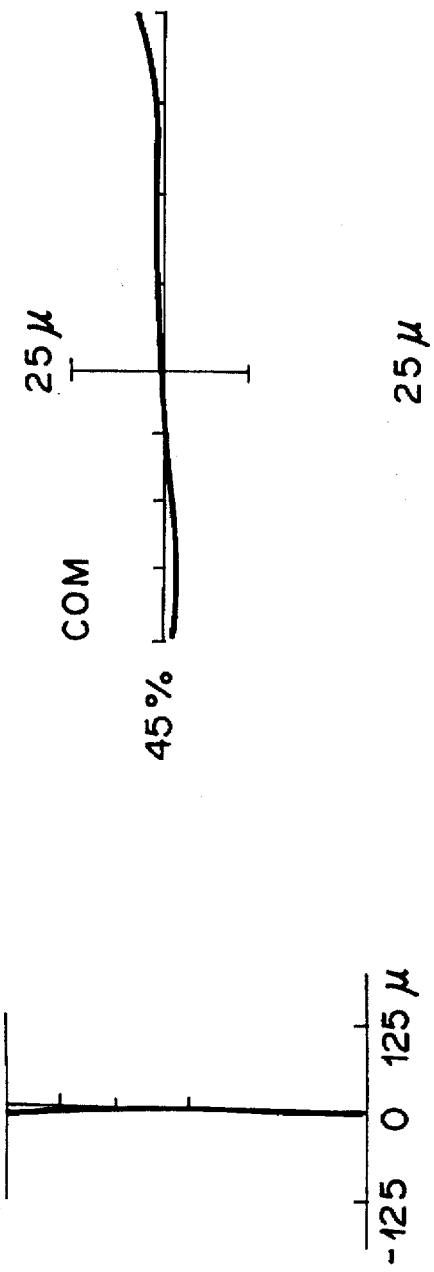
FIG. 4 is an aberration chart of the wide angle lens in accordance with the second embodiment of the present invention.
Figure 4:
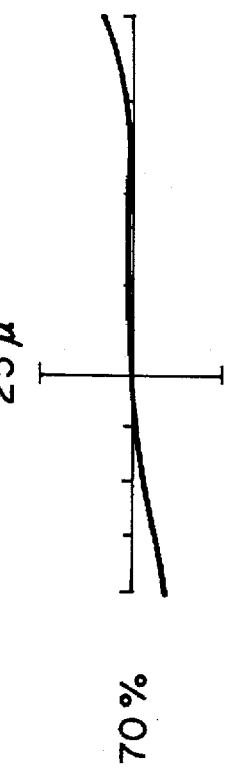
Figure 4:
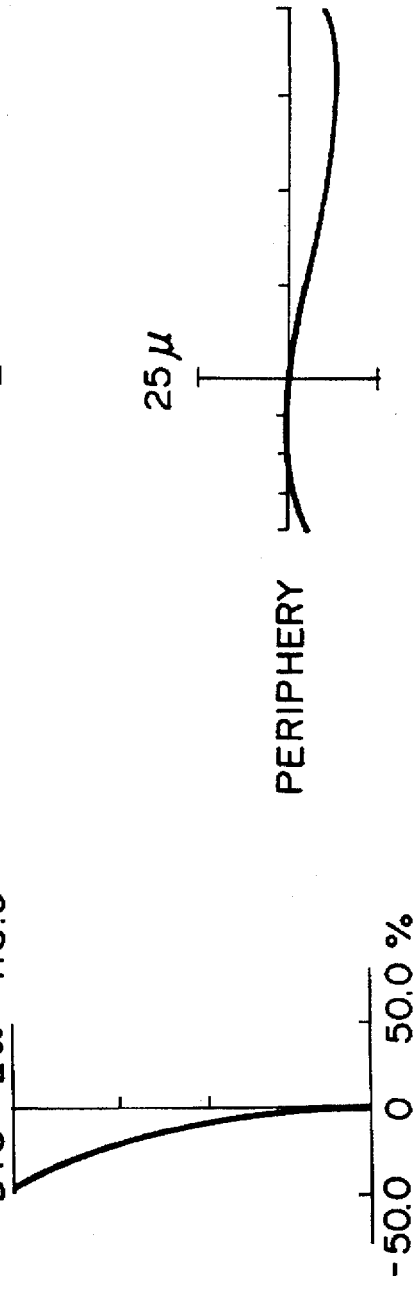

Also, FIG. 3 shows an aberration chart [including spherical aberration (SPH), curvature of field (DIS), and coma (COM)] for the wide angle lens 12 in accordance with the first embodiment of the present invention, while FIG. 4 shows that of the wide angle lens 16 in accordance with the second embodiment.

Here, in these aberration charts, 2ω depicts field angle.

As can be seen from the aberration charts of FIGS. 3 and 4, various kinds of aberration can be made favorable in the wide angle lenses 12 and 16 in accordance with the foregoing embodiments.

Without being restricted to the foregoing embodiments, the wide angle lens of the present invention can be modified in various manners within the scope of the present invention. For example, the first and second lenses may be formed as biconcave lenses instead of the meniscus lenses used in the embodiments.

Further, any of glass and plastics may be selected as a material for constituting each lens.

As explained in the foregoing, the wide angle lens in accordance with the present invention can favorably correct various kinds of aberration and, while the cost required for molding each lens is minimized, a brightness higher than that of the conventional wide angle lens can be obtained.

TABLE 1

| Surface | R | d | $N_d$ | $v_d$ |
|---|---|---|---|---|
| 1 | 34.549 | 1.60 | 1.49018 | 57.8 |
| 2 | 3.723 | 1.87 | | |
| 3 | 30.581 | 1.60 | 1.49018 | 57.8 |
| 4 | 3.299 | 3.91 | | |
| 5 | 9.048 | 2.62 | 1.49018 | 57.8 |
| 6 | −4.873 | 0.50 | | |
| 7 | 17.769 | 2.62 | 1.49018 | 57.8 |
| 8 | −4.484 | 0 | | |
| 9 | ∞ | 4.53 | 1.51633 | 64.1 |
| 10 | ∞ | | | |

TABLE 2

| Surface | C | K | $a_1$ | $a_2$ | $a_3$ | $a_4$ | $a_5$ |
|---|---|---|---|---|---|---|---|
| 1 | $2.89444 \times 10^{-2}$ | 1.0 | 0 | $-0.204008 \times 10^{-3}$ | $0.624910 \times 10^{-6}$ | $-0.438395 \times 10^{-7}$ | $0.116815 \times 10^{-8}$ |
| 2 | $2.68601 \times 10^{-1}$ | 1.0 | 0 | $0.222072 \times 10^{-3}$ | $-0.868853 \times 10^{-5}$ | $-0.217717 \times 10^{-7}$ | $-0.326360 \times 10^{-9}$ |
| 3 | $3.27000 \times 10^{-2}$ | 1.0 | 0 | $-0.387078 \times 10^{-3}$ | $0.120468 \times 10^{-5}$ | $-0.404703 \times 10^{-7}$ | $0.117481 \times 10^{-8}$ |
| 4 | $3.03122 \times 10^{-1}$ | 1.0 | 0 | $0.166014 \times 10^{-3}$ | $-0.862906 \times 10^{-5}$ | $-0.217528 \times 10^{-7}$ | $-0.326363 \times 10^{-9}$ |
| 5 | $1.11052 \times 10^{-1}$ | 1.0 | 0 | $-0.190004 \times 10^{-2}$ | $-0.187519 \times 10^{-4}$ | $-0.440205 \times 10^{-7}$ | $-0.351066 \times 10^{-9}$ |
| 6 | $-2.05212 \times 10^{-1}$ | 1.0 | 0 | $0.963231 \times 10^{-3}$ | $0.293183 \times 10^{-4}$ | $0.260976 \times 10^{-7}$ | $-0.392873 \times 10^{-9}$ |
| 7 | $5.62777 \times 10^{-2}$ | 1.0 | 0 | $-0.161728 \times 10^{-2}$ | $-0.187977 \times 10^{-4}$ | $-0.440311 \times 10^{-7}$ | $-0.351069 \times 10^{-9}$ |
| 8 | $-2.23015 \times 10^{-1}$ | 1.0 | 0 | $0.112627 \times 10^{-2}$ | $0.291085 \times 10^{-4}$ | $0.259785 \times 10^{-7}$ | $-0.392916 \times 10^{-9}$ |

TABLE 3

| Surface | R | d | $N_d$ | $v_d$ |
|---|---|---|---|---|
| 1 | 21.143 | 1.60 | 1.49018 | 57.8 |
| 2 | 3.309 | 2.09 | | |
| 3 | 21.143 | 1.60 | 1.49018 | 57.8 |
| 4 | 3.309 | 3.68 | | |
| 5 | 12.285 | 2.62 | 1.49018 | 57.8 |
| 6 | −4.679 | 0.50 | | |
| 7 | 12.285 | 2.62 | 1.49018 | 57.8 |
| 8 | −4.679 | 0 | | |
| 9 | ∞ | 4.53 | 1.51633 | 64.1 |
| 10 | ∞ | | | |

TABLE 4

| Surface | C | K | $a_1$ | $a_2$ | $a_3$ | $a_4$ | $a_5$ |
|---|---|---|---|---|---|---|---|
| 1 | $4.72970 \times 10^{-2}$ | 1.0 | 0 | $-0.276136 \times 10^{-3}$ | $0.143479 \times 10^{-5}$ | $-0.403001 \times 10^{-7}$ | $0.117489 \times 10^{-8}$ |
| 2 | $3.02206 \times 10^{-1}$ | 1.0 | 0 | $0.181143 \times 10^{-3}$ | $-0.863009 \times 10^{-5}$ | $-0.217596 \times 10^{-7}$ | $-0.326368 \times 10^{-9}$ |
| 3 | $4.72970 \times 10^{-2}$ | 1.0 | 0 | $-0.276136 \times 10^{-3}$ | $0.143479 \times 10^{-5}$ | $-0.403001 \times 10^{-7}$ | $0.117489 \times 10^{-8}$ |
| 4 | $3.02206 \times 10^{-1}$ | 1.0 | 0 | $0.181143 \times 10^{-3}$ | $-0.863009 \times 10^{-5}$ | $-0.217596 \times 10^{-7}$ | $-0.326368 \times 10^{-9}$ |
| 5 | $8.14001 \times 10^{-2}$ | 1.0 | 0 | $-0.161728 \times 10^{-2}$ | $-0.187977 \times 10^{-4}$ | $-0.440311 \times 10^{-7}$ | $-0.351069 \times 10^{-9}$ |
| 6 | $-2.13721 \times 10^{-1}$ | 1.0 | 0 | $0.866821 \times 10^{-3}$ | $0.293370 \times 10^{-4}$ | $0.260579 \times 10^{-7}$ | $-0.392899 \times 10^{-9}$ |
| 7 | $8.14001 \times 10^{-2}$ | 1.0 | 0 | $-0.161728 \times 10^{-2}$ | $-0.187977 \times 10^{-4}$ | $-0.440311 \times 10^{-7}$ | $-0.351069 \times 10^{-9}$ |
| 8 | $-2.13721 \times 10^{-1}$ | 1.0 | 0 | $0.866821 \times 10^{-3}$ | $0.293370 \times 10^{-4}$ | $0.260579 \times 10^{-7}$ | $-0.392899 \times 10^{-9}$ |

What is claimed is:

1. A wide angle lens comprising, successively from an object side, first, second, third, and fourth lenses, each of said first and second lenses being made of a concave lens whose concave surface with a stronger curvature is directed toward an imaging surface, each of said third and fourth lenses being made of a convex lens, said first and second lenses having at least one aspheric surface each and being configured so as to satisfy a conditional expression:

$$0.8 < f_2/f_1 < 1.2$$

wherein $f_1$ and $f_2$ are respective focal lengths thereof, said third and fourth lenses having at least one aspheric surface each and being configured so as to satisfy a conditional expression:

$$0.8 < f_4/f_3 < 1.2$$

wherein $f_3$ and $f_4$ are respective focal lengths thereof.

2. A wide angle lens according to claim 1, wherein said first and second lenses are configured so as to satisfy a conditional expression:

$$f_2/f_1 = 1$$

wherein $f_1$ and $f_2$ are respective focal lengths thereof and wherein said third and fourth lenses are configured so as to satisfy a conditional expression:

$$f_4/f_3 = 1$$

wherein $f_3$ and $f_4$ are respective focal lengths thereof.

* * * * *